United States Patent [19]

Henderson

[11] Patent Number: 4,759,103

[45] Date of Patent: Jul. 26, 1988

[54] MANUALLY OPERABLE FASTENER

[76] Inventor: Roy W. Henderson, 117 Knockview Drive, Tandragee, Craigavon, Northern Ireland

[21] Appl. No.: 863,105

[22] Filed: May 14, 1986

[30] Foreign Application Priority Data

May 15, 1985 [GB] United Kingdom ............... 8512234

[51] Int. Cl.$^4$ ............................................. A44B 13/02
[52] U.S. Cl. ................................. 24/236; 24/131 R; 24/237; 24/533; 24/549
[58] Field of Search ............... 24/236, 237, 129 C, 24/131 R, 533, 546, 547, 549, 551, 567

[56] References Cited

U.S. PATENT DOCUMENTS

| 409,880 | 8/1889 | Stewart | 24/549 |
|---|---|---|---|
| 440,056 | 11/1890 | Pennington | 24/237 |
| 449,072 | 3/1891 | Gillis | 24/131 R |
| 472,962 | 4/1892 | Collins | 24/237 |
| 763,921 | 7/1903 | Sibley | 24/237 |
| 958,532 | 5/1910 | Pollock | 24/549 |
| 1,846,421 | 2/1932 | Guerrant | 24/237 |
| 1,878,497 | 9/1932 | Lehr | 24/533 |
| 2,158,937 | 5/1939 | Hilderbrant | 24/549 X |
| 2,240,235 | 4/1941 | Whan | 24/237 |
| 2,513,759 | 7/1950 | Tarallo | 24/533 X |
| 2,574,755 | 11/1951 | Petrie | 24/237 X |
| 2,810,176 | 10/1957 | Gaafar | 24/237 |
| 2,820,274 | 1/1958 | Ballentine | 24/236 |
| 3,263,879 | 8/1966 | Sanderson | 24/237 X |
| 3,747,169 | 7/1973 | Anderson et al. | 24/237 |

Primary Examiner—Kenneth J. Dorner
Assistant Examiner—Laurie K. Cranmer
Attorney, Agent, or Firm—Scully, Scott, Murphy & Presser

[57] ABSTRACT

A manually operable quick action fastener, intended for both sporting and industrial use, consists essentially of a single length of wire which is formed into a closed triangular torsion spring having its torsion coils within the triangular shape and whose ends are formed, at the base of the triangle, into a closing hook and a locking arm. Other embodiments allow the closing hook to be strengthened by double winding or resin cladding, or both, and for higher load bearing models the wire winding of the basic triangular shape is modified to produce deflection limiting ends which allow the complete fastener to interlock and bear loads approaching the elastic limit of the material without slip of the parts.

16 Claims, 7 Drawing Sheets

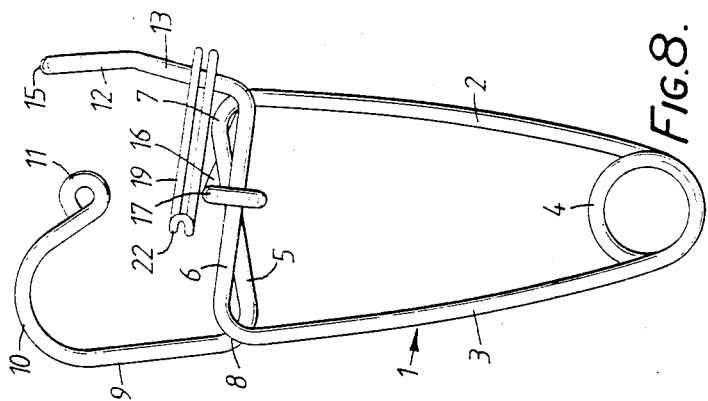
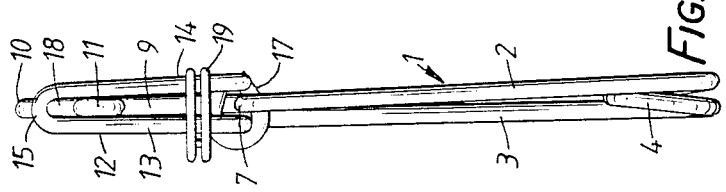
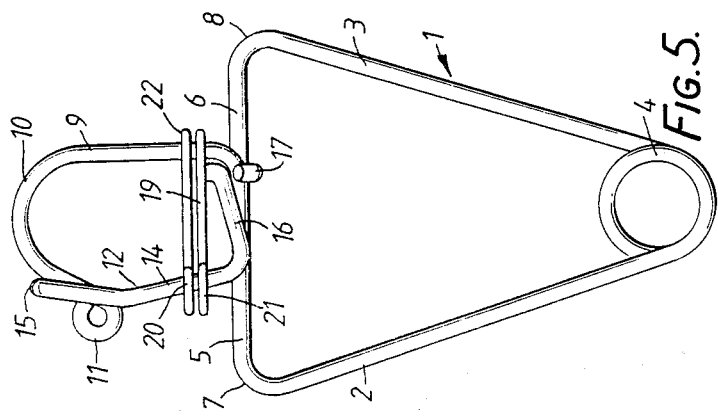
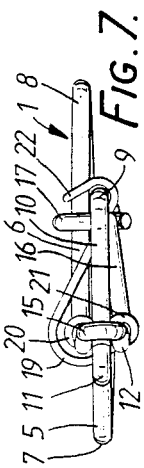

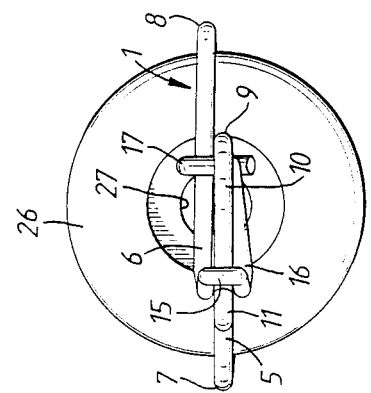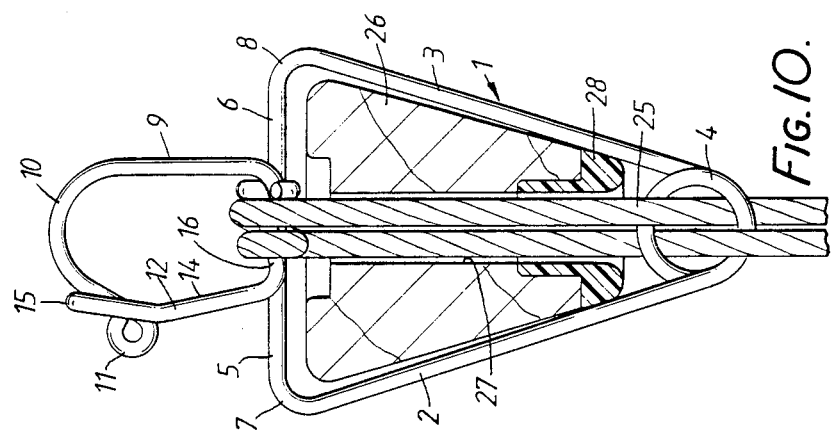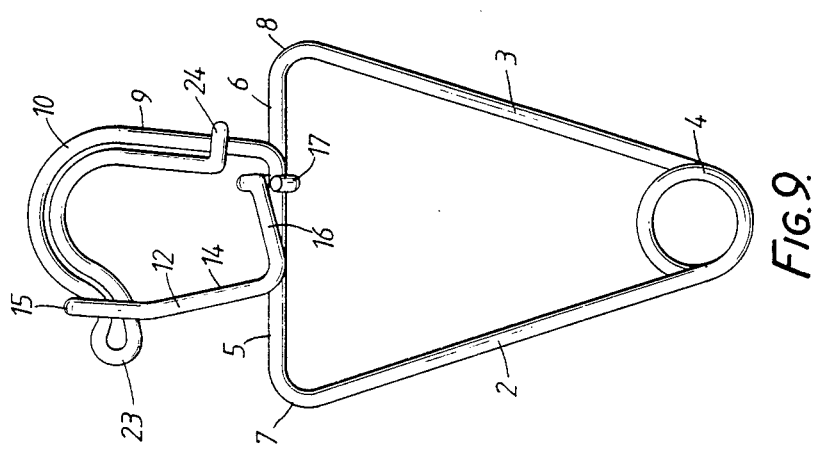

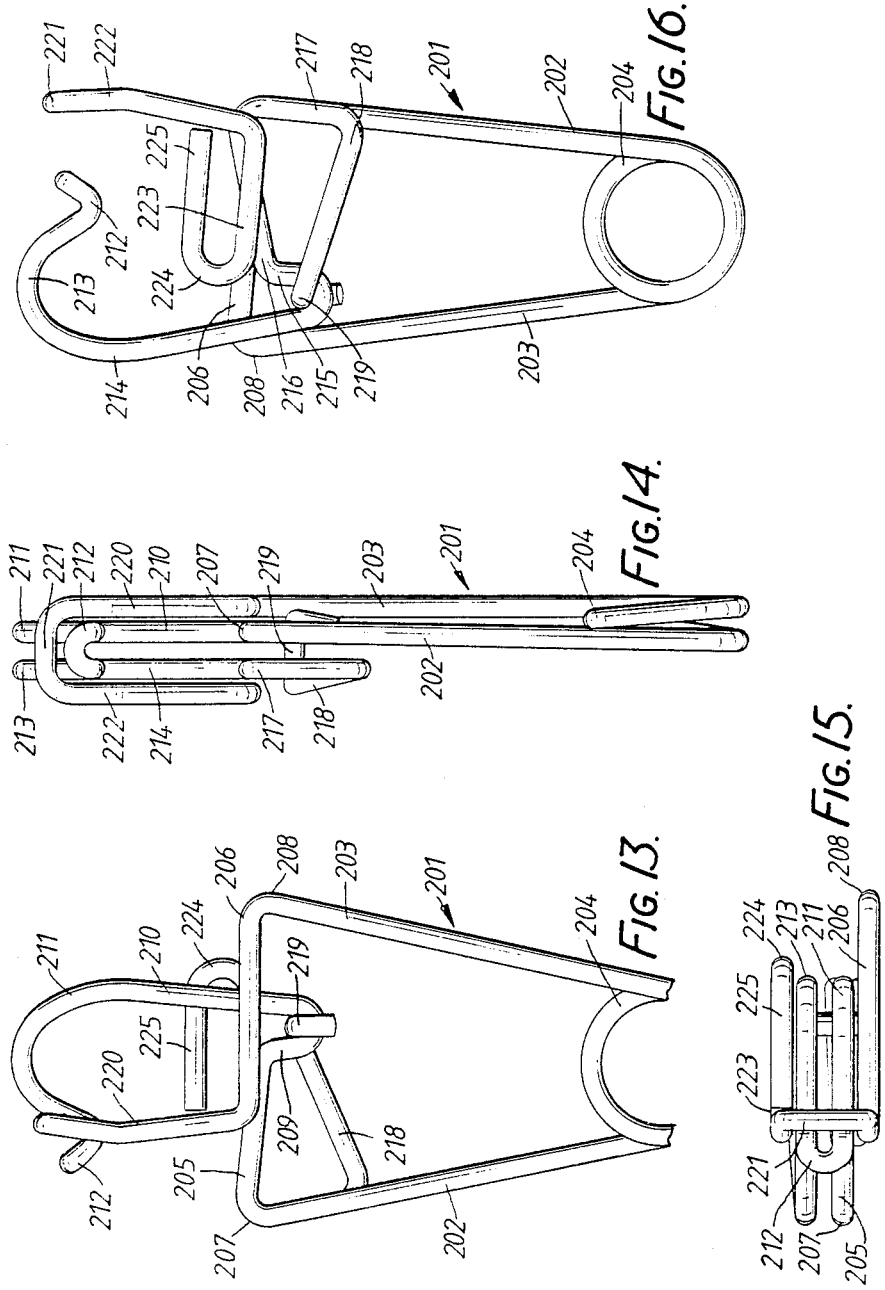

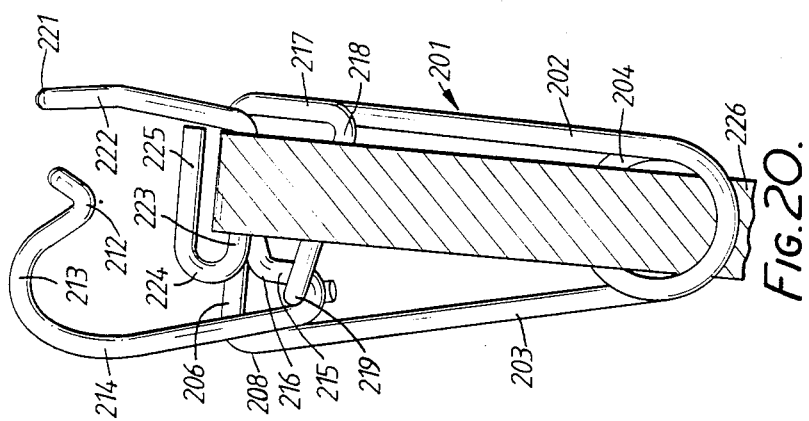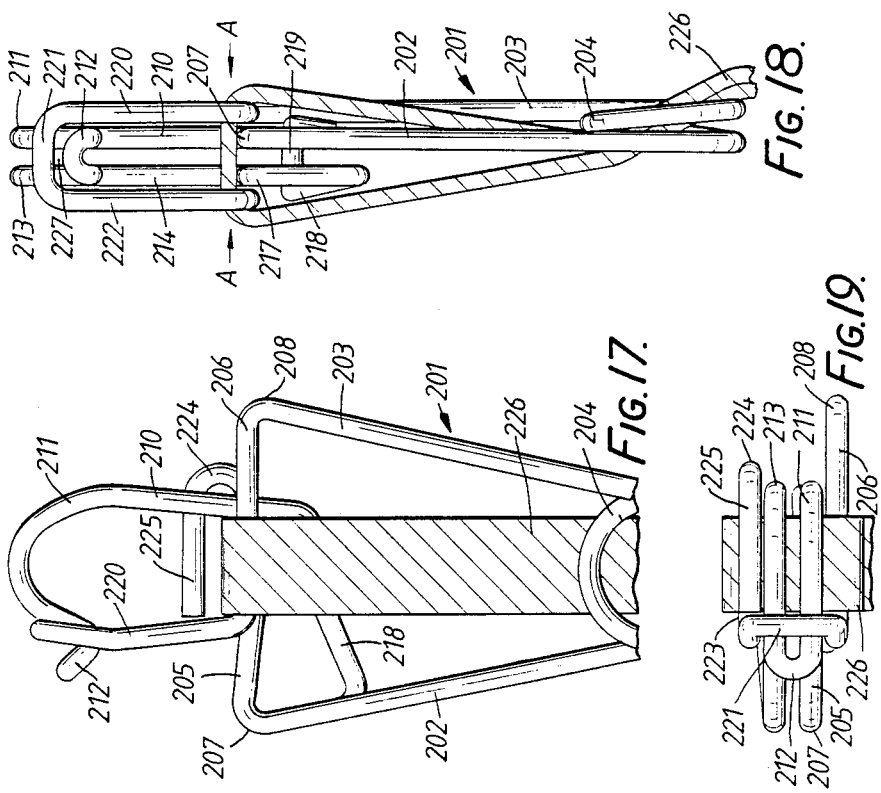

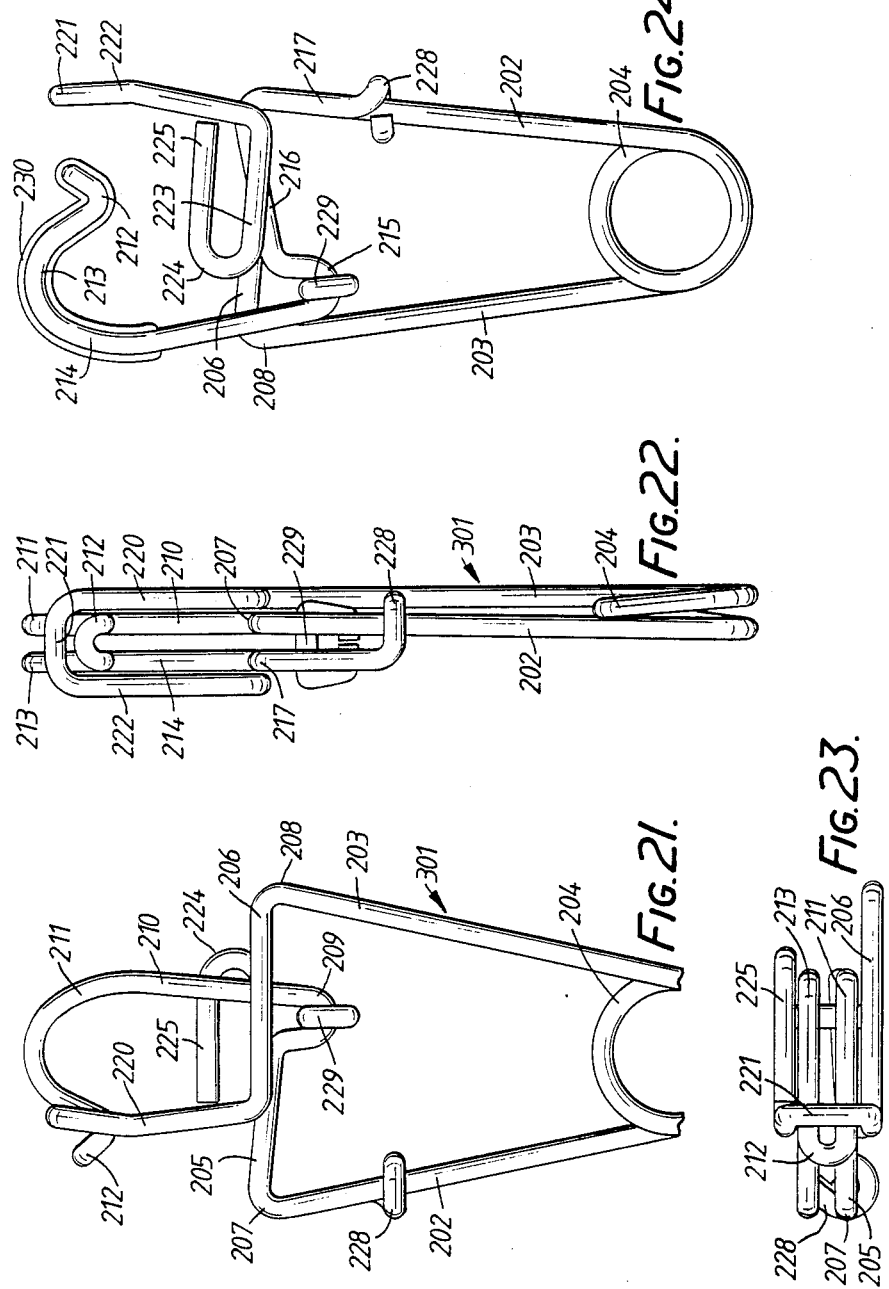

MANUALLY OPERABLE FASTENER

This invention relates to manually operable fasteners. In particular it relates to a manually operable fastener for releasable attachment of a rope or strap to an anchorage or the like.

Many different designs of releasable fastener are available on the market for releasable attachment of ropes to anchorages. Such fasteners find uses for anchoring ropes in a wide variety of applications, including sailing where they are widely used in the rigging of yachts and dinghies. In addition many types of safety harness for use in hazardous situations incorporate quick action fasteners to enable the wearer to secure himself safely to a suitable anchorage. Typical situations in which such safety harnesses are used include scuba diving, mountaineering, yachting, and erection of or work on scaffolding, particularly for high buildings.

In most conventional designs such fasteners incorporate a hook for engagement with the anchorage or the like and the releasable action is provided by means of a spring loaded catch which closes off the hook and prevents inadvertent disengagement of the fastener from the anchorage. In some cases security is provided by means of a captive nut as in the case of link shackles.

Fasteners with spring action catches are sold under a wide variety of names including carabiners, snap shackles, safety snap hooks, jib hanks, carbine hooks, piston hanks and boat snaps. In most cases an eye is formed in the fastener to which an end of the rope or strap can be fastened, although in some cases, such as carbine hooks and link shackles, no separate eye is provided for this purpose.

All of these prior designs generally speaking suffer from one or more disadvantages. In particular most, if not all, of them are formed from several pieces. Typical materials of construction include stainless steel, mild steel and galvanised steel. By reason of their design it is necessary to use one or more machining operations in the manufacture of such fasteners. Hence consideration must be given to the machining operations, such as milling or drilling, when deciding upon the material of construction. For practical purposes it is accordingly necessary when using, for example, stainless steel to select a normalised stainless steel having a tensile strength of no more than about 590 Newtons/mm$^2$. Although it is well known that the tensile strength of stainless steel can be increased by cold drawing so as to produce wire or strand with a tensile strength about 1390 Newtons/mm$^2$ or higher, it is impractical to use such drawn wire or strand for manufacture of releasable fasteners of conventional design because it becomes too difficult to carry out the required machining operations. As a result the strength to weight ratio of such fasteners has usually been limited by the tensile strength of stainless steel or other material used in their manufacture.

In addition many such designs of fastener are somewhat fiddly to operate and are accordingly unsatisfactory for use in hazardous situations, particularly in cold conditions when the user may have heavily gloved or numb hands, as in sub-aqua diving. For example, it is frequently necessary to use a totally different and more complex action to release the fastener than the action required to engage the fastener with an anchorage.

The present invention accordingly seeks to provide a novel improved form of manually operable fastener for use with ropes and straps which can be made from stainless steel wire or strand. It further seeks to provide a quick action fastener for ropes or straps which can be operated even in cold conditions with one hand. It additionally seeks to provide a manually operable fastener in which the same action is used to open the fastener whether it is to be engaged with, or released from, an anchorage.

According to the present invention there is provided a manually operable fastener comprising a length of wire or strand bent into a substantially flat shape and including a first leg; a second leg; an intermediate portion between the first and second legs formed into a flat spiral spring which is maintained under torsion in the normally closed condition of the fastener and is connected at one end to a proximal end of the first leg and at its other end to a proximal end of the second leg, the first and second legs subtending an acute angle therebetween; a first transverse member connected at one of its ends to a distal end of the first leg; a second transverse member connected at one of its ends to a distal end of the second leg, the first and second transverse members extending towards one another and including overlapping parts which lie in juxtaposed relationship one with another and are substantially parallel to one another in a normally closed condition of the fastener; a hook portion at the other end of the first transverse member, the hook portion including a shank extending away from the intermediate portion, a bend portion that has its concave side facing towards the intermediate portion, and a smooth retroussé tip; and a retainer portion at the other end of the second transverse member, the retainer portion including a loop portion to receive the hook portion in a normally closed condition of the fastener, third transverse or cross member extends from the retainer in a direction parallel to the first and second transverse members, disposed on the side of the first transverse member opposite from the second transverse member so the first transverse member lies between the second and third transverse members, the retainer portion forming together with the hook portion and the overlapping parts of the first and second transverse members an essentially closed loop in the normally closed condition of the fastener; said fastener being openable by manually squeezing the first and second arms towards one another against the torsion of the flat spiral spring thereby to disengage the hook portion from the loop portion of the retainer portion. Upon application of a load to a rope or strap in the closed loop, the rope or strap squeezes the three transverse members together so that the second and third transverse members grip the first transverse member. This gripping action holds the first and second transverse members substantially parallel to each.

It will thus be seen that the invention provides a manually operable fastener which can be formed from a single length of wire or strand bent into a substantially flat shape without any need for machining operations, such as milling or drilling. As a consequence it is possible to use in its construction stainless steel and other high tensile alloy spring steels and coated high tensile alloy spring steels of the highest available tensile strengths. In this way a very significantly improved strength to weight ratio can be imparted to fasteners constructed according to the invention compared with the currently available state of the art devices.

As already mentioned the fastener of the invention is made from a length of wire or strand; such strand can be of any available cross section, such as a hexagonal, square or rectangular cross section.

In a preferred form of fastener according to the invention the first and second legs define together with the transverse members a substantially triangular outline with the flat spiral spring lying within said triangular outline.

Preferably there is, in the unloaded condition of the fastener, a clearance between the retroussé tip and the closed end of the loop portion of the retainer means permitting opening of the fastener, the fastener being adapted to undergo elastic deformation during loading thereof thereby to cause locking of the retroussé tip in the loop of the retainer means.

A clip lock may be incorporated into the fastener to prevent inadvertent opening of the fastener in its unloaded condition. In one form the clip lock comprises a second length of wire or strand of smaller section than that of the first mentioned wire or strand, bent to form a hook one end of which is secured to the retainer portion and the hooked end of the clip lock being engageable with the hook portion of the fastener itself.

For certain applications, such as for sub-aqua use, it may be desirable to include a locking member having a channel therethrough for receipt of a rope or strap which is arranged to lie in the loaded condition of the fastener in the space between the first and second legs and between the transverse members and the intermediate portion thereby to prevent movement of the first and second legs one towards another and consequential inadvertent opening of the fastener, which locking member is arranged to be displaceable out of the said space in the unloaded condition of the fastener to permit the first and second legs to be squeezed manually one towards another to open the fastener.

Such a locking member may be formed as a float in the shape of a truncated cone or as an axial section of a truncated cone.

The retroussé tip may be formed by a curled over end of the first mentioned wire or strand.

It will often be preferred for the fastener to further include locating means to maintain the overlapping parts of the first and second transverse members in juxtaposed relationship. Such locating means may be formed by an end of the wire or strand bent around the transverse members.

In a particularly preferred embodiment the hook portion is formed by bending the first mentioned length of wire or strand back on itself at the retroussé tip of the hook portion so that the bend portion is formed by a pair of side-by-side corresponding portions of said wire or strand. In such an embodiment said wire or strand may be bent towards the intermediate portion at said other end of the first transverse member so as to form a first lobe at the base of the shank of the hook portion, said wire or strand forming the hook portion being continued to form a second lobe and a further transverse member substantially parallel to and aligned with the first lobe and with the first transverse member respectively, and deflection limiting means may be provided for engagement with said first and second lobes. Such deflection limiting means may be integrally formed in said length of wire or strand by the free end of a continuation of said further transverse member. Alternatively said deflection limiting means may comprise a second length of wire or strand which is bent around said first and second lobes.

In order that the invention may be clearly understood and readily carried into effect some preferred embodiments thereof will now be described, by way of example only, with reference to the accompanying drawings, wherein:

FIGS. 5 to 8 are similar views of a modified form of manually operable fastener constructed according to the invention including a clip lock;

FIG. 9 illustrates a third form of fastener according to the invention with a strengthened hook portion;

FIG. 10 is a front view, partially in section, of a manually operable fastener according to the invention which is particularly adapted for sub-aqua use;

FIG. 11 is a top plan view of the device of FIG. 10;

FIG. 13 is a front view, partly cut away, of a further form of fastener particularly adapted for use with straps;

FIGS. 14 and 15 are side and top plan views respectively of the fastener of FIG. 13;

FIG. 16 is a back view of the fastener of FIGS. 13 to 15 in its open condition;

FIGS. 17 to 20 are similar views to those of FIGS. 13 to 16 showing the fastener thereof in use with a strap; and FIGS. 21 to 24 are similar views to those of FIGS. 13 to 16 showing a further form of fastener for use with straps.

Figure 4:
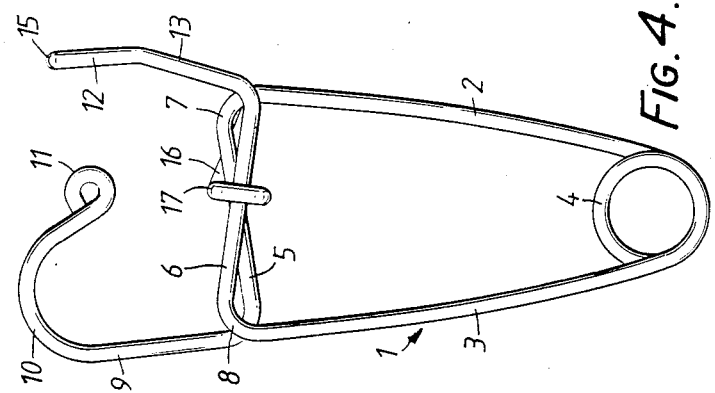
FIG. 4 is a back view of the fastener of FIGS. 1 to 3 in its open position.
Figure 2:
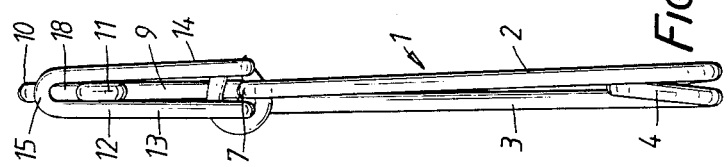
FIGS. 2 and 3 are side and top plan views of the fastener of FIG. 1.

Referring to FIGS. 1 to 4 of the drawings, a manually operable quick action rope fastener 1 is formed from a single length of 3.65 mm diameter stainless steel wire which has been bent into a substantially flat shape. Suitable forms of stainless steel include Types 302S26 (formerly also known as EN58A) and 316S42 (formerly also known as EN58J) as described in British Standard No. 2056, revised in 1983; the former has a higher tensile strength than the latter, but the latter is better suited for use in marine environments, such as for yachting and for sub-aqua use. For wire of 2.8 to 4.0 mm diameter the tensile strength of Type 302S26 is 1470–1710 Newtons/mm$^2$ and of Type 316S42 is 1260–1500 Newtons/mm$^2$. For wire of 4.0 to 6.0 mm diameter, on the other hand, the tensile strength of Type 302S26 is 1370–1610 Newtons/mm$^2$, whilst that of Type 316S42 is 1100–1340 Newtons/mm$^2$. In the normally closed condition of the fastener illustrated in FIG. 1, a central part of the length of wire has substantially the shape of an isosceles triangle, the longer sides of which are formed by first and second legs 2 and 3 joined at the apex of the isosceles triangle by an intermediate portion 4 in the form of a flat spiral spring. The legs 2, 3 are connected at their proximal ends to respective ends of intermediate portion 4 and form tangential extensions to the intermediate portion 4. The base of the isosceles triangle is formed by first and second transverse members 5 and 6 which are connected to the distal ends of the first and second arms 2 and 3 respectively via respective bends 7 and 8. The torsion coils of flat spiral spring 4 lie at the apex of, and within, the outline of the above-mentioned isosceles triangle. First transverse member 5 carries a hook portion comprising a shank 9 which extends in a direction away from intermediate portion 4, a bend portion 10 whose concave side faces towards intermediate portion 4 and a smooth curled over end 11 forming a retroussé tip to the hook portion. Transverse member 6 carries at its free end a retainer portion 12 which also extends in a direction away from the intermediate portion 4. Retainer portion 12 is formed by a pair of arms 13, 14 which are connected by a hairpin bend 15 so as to form a loop portion to receive the retroussé tip 11 of the hook portion. Arm 14 is extended by means of a cross member 16, the free end 17 of which is curled around both of transverse members 5 and 6 so as to form a locating means which maintains the overlapping parts of transverse members 5 and 6 in juxtaposed relationship. The curled end 17 further serves to act as a constraint to the maximum deflection of the flat spiral spring of intermediate portion 4. In the normally closed condition illustrated in FIG. 1 the flat spiral spring of intermediate portion 4 is in torsion so that the hairpin bend 15 abuts against the outer convex side of bend portion 10.

Figure 1:
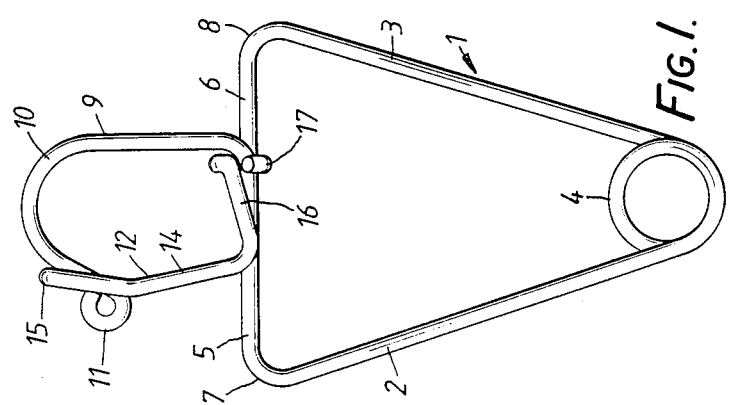
FIG. 1 is a front view of a manually operable fastener for anchoring a rope or strap to an object, the fastener being illustrated in its normally closed position.
Figure 3:
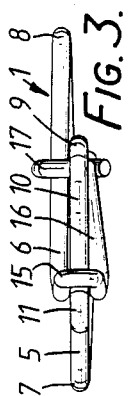

In use of the fastener 1 of FIGS. 1 to 4 a rope or strap is passed in a first direction through the eye of the torsion coils of intermediate portion 4 up and around the overlapping parts of transverse members 5 and 6 between the shank 9 and the retainer portion 12 and then down again through the eye in the torsion coils of intermediate portion 4 in a direction opposite to the first direction. When bend portion 10 is engaged with an anchorage and then a load is applied to the rope or strap (not shown), in a downward direction as illustrated in FIG. 1, the load on the rope or strap squeezes transverse member 5 and cross member 16 towards one another and cause arms 13 and 14 to deflect inwards so as to trap transverse member 5 between them. The strain energy begins to straighten the bend portion 10 of the hook portion 9 so as eventually to interlock the retroussé tip 11 of the hook portion 9 with the hairpin bend 15 of the retainer portion 12. Hence when the fastener of FIGS. 1 to 4 is put under increasing load, the gap 18 (shown in FIG. 2) between tip 10 and hairpin bend 15 is correspondingly reduced eventually to zero, due to elastic deformation of the various parts of the fastener 1. In this elastic deformation other parts of the fastener can also flex elastically, such as the bends 7 and 8. Hence in the loaded condition retroussé tip 11 locks firmly against hairpin bend 15 and prevents inadvertent dislodgement from the anchorage. Upon removal of the load the fastener 1 recovers its original shape elastically, transverse member 5 and cross member 16 spring apart to release transverse member 5 and automatically loosen the grip of the rope or strap on transverse members 5 and 6 and gap 18 reappears.

On the other hand, when the fastener of FIGS. 1 to 4 is not under load, the existence of the gap 18 permits a user to apply a squeezing pressure to the legs 2 and 3 which can flex inwardly against the action of the flat spiral spring of intermediate portion 4, thereby to disengage the retroussé tip 11 from the retainer portion 12, as shown in FIG. 4. The user can then engage the fastener 1 with, or disengage it from, an anchorage. As the legs 2 and 3 flex inwardly bend 7 passes between the arms 13 and 14 which accordingly help the fastener 1 to open correctly and to retain its substantially flat shape. Upon the squeezing pressure being released the stored energy in the torsion coils of flat spiral spring 4 is released and the fastener 1 automatically readopts the conformation of FIG. 1.

It will thus be seen that the same action is used, i.e. a simple squeezing action, to open the fastener of FIGS. 1 to 4 whether this is required for engaging it with an anchorage or for releasing it therefrom.

The fastener of FIGS. 5 to 8 is generally similar to that of FIGS. 1 to 4 and like reference numerals have been used to indicate like parts therein. It is particularly suitable for use with safety harnesses for use by yachtsmen. The fastener of FIGS. 5 to 8 incorporates an automatically self closing spring clip lock 19. This is formed from a single length of wire doubled back on itself in a first plane (at right angles to the plane of the paper in FIG. 7) at a hairpin bend so as to form a shank which is also bent into a double hook shape in a second plane substantially at right angles to the first plane (and parallel to the plane of the paper in FIG. 7). The ends of this further length of wire being secured to retainer portion 12 are wound round arms 13 and 14, as indicated at 20 and 21 in FIG. 7, the bent over portion 22 with its hairpin bend at the other end of the shank of the clip lock 19 being engageable around shank 9 to prevent inadvertent dislodgement of the fastener when this is not under load.

To open the fastener of FIGS. 5 to 8, whether in order to engage it with an anchorage or guide rope or to remove it therefrom, the bent over portion 22 of clip lock 19 is disengaged from shank 9 to permit the fastener to be opened as illustrated in FIG. 8, by squeezing legs 2 and 3 towards one another. On releasing the squeezing, pressure, the fastener automatically closes again.

If desired, an operating member of plastics material (not shown) may be moulded on the shank of clip lock 19 so as to form a trigger operable by the user's index finger, which facilitates operation thereof, as well as strengthening clip lock 19 and reducing the risk of accidental damage such as might arise if the fastener were lying on the ground as shown in FIG. 7 and were to be accidentally trodden upon.

The modified fastener of FIG. 9 is generally similar to that of FIGS. 1 to 4 except that the hook portion is formed by looping the end of the wire back upon itself to form a smooth retroussé tip 23, the end terminating as a knot 24. Hence the fastener of FIG. 9 has a double wire bend portion 10 with consequently increased strength. Knots 17 and 24 are formed so as to ensure that all moving parts are as smooth as possible so that the risk of tangling of fibres, coarse grass or sea weed with the fastener of FIG. 9 is minimised.

FIGS. 10 and 11 illustrate how the fastener of FIGS. 1 to 4 can be adapted for sub-aqua use, for example for securing a scuba diver's life line to a mooring line for a buoy or other form of guide line. Reference numeral 25 indicates a rope, such as a scuba diver's life line, which is passed through the eye of the flat spiral spring of intermediate portion 4 in one direction, is wound around the overlapping parts of transverse members 5 and 6 and cross member 15 and is then passed back down again through the eye of intermediate portion 4 in the opposite direction. A float 26, in the shape of a truncated cone, can be employed as a locking device. This can be made, for example, from wood or from a suitably light plastics material and has a central channel 27 to allow fixing of the rope or strap to the fastener 1. FIG. 10 shows how the geometry of the float is specifically mismatched with that of the triangular shape of the fastener 1, in that the included angle at the vertex of the cone of float 26 is less than the angle between legs 2 and 3, in order to ensure that wearing contact between the float 26 and the stainless steel body of the fastener is mainly at a nylon insert 28.

In FIG. 11 the rope 25 is omitted for the sake of clarity.

In use of the fastener of FIGS. 10 and 11, float 26 imparts positive buoyancy to the fastener and normally prevents opening of the fastener. To open the fastener to allow the bend portion 10 to be engaged with or disengaged from an anchorage or guide line, the float 26 is displaced sideways (i.e. upwards or downward as drawn in FIG. 11) so as to permit the legs 2 and 3 to be squeezed together. This sideways displacement of float 26 can be achieved with the palm of the hand and does not require use of the user's fingers. Thus the fastener can be used even with heavily gloved hands and can be operated with one hand. As with the fastener of FIGS. 1 to 4, the same action is used to secure the fastener of FIGS. 10 and 11 to a guide line or anchorage as is required to release it therefrom.

Figure 12:
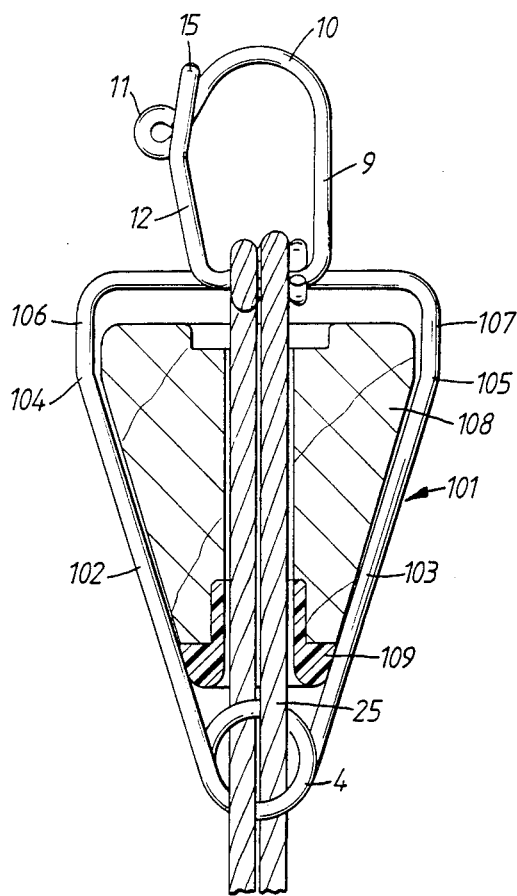
FIG. 12 is a front view of a modified form of fastener, also adapted for sub-aqua use.

FIG. 12 illustrates a further form of fastener 101, which is generally similar to the fastener of FIGS. 1 to 4, except that the first and second legs 102 and 103 are bent at knees 104 and 105 so as to provide parallel portions 106 and 107. Reference numeral 108 indicates a float in the shape of a truncated cone.

Parallel portions 106 and 107 provide greater scope for rope clearance during interlocking without allowing any extra transverse movement of the shank 9 and retainer 12 when the fastener is put under load. In addition they permit a larger float 108 to be used than is the case for the fastener of FIGS. 10 and 11, hence enabling greater buoyancy to be imparted to the fastener (which may be required if a heavier thickness of wire or strand is used for its construction), whilst not increasing the size of the whole fastener beyond what can be conveniently grasped in a heavily gloved hand. As can be seen from FIG. 12 the geometry of the float 108 and the geometry of the fastener 101 have been mismatched so that wear contact is between the stainless steel wire of the legs 102 and 103 and the nylon insert 109 of float 108.

The fastener of FIG. 12 operates in a similar manner to that of the fastener of FIGS. 10 and 11.

In a modification of the devices of FIGS. 10 and 11 and of FIG. 12 for use with straps rather than ropes, the truncated cone 26 or 108 is replaced by a flat axial conic section of similar outline and the channel 27 is replaced by a slot for a strap. In this case the strap acts to align the flat axial conic section within the fastener so that it acts as a locking device until displaced.

FIGS. 13 to 16 illustrate a strengthened form of fastener 201 which is particularly suitable for use with straps. This is made from 4.5 mm diameter stainless steel wire (e.g. Type 302S26, as described in British Standard 2056 (as revised in 1983), which was formerly known as EN58A). It includes first and second legs 202 and 203 joined at their proximal ends to an intermediate portion 204 (which is partially cut away in FIG. 13) formed into a flat spiral spring. First and second transverse members 205 and 206 are connected to the distal ends of legs 202 and 203 respectively by means of bends 207 and 208 respectively. As can be seen from FIG. 13 the inner end of transverse member 205 is bent downwardly toward flat spring portion 204 and then back on itself to form a lobe 209 between transverse member 205 and shank 210 which forms part of hook portion 211. The tip of hook portion 211 is given an upward turn, as indicated at 212, to form a retroussé tip to the end of hook portion 211. The wire is then bent back on itself to form a curved portion 213 which is parallel to curved portion 211. Arm 214 is provided parallel to arm 210 and lobe 215 is parallel to lobe 209 and connects arm 214 to member 216. Member 216 runs parallel to transverse member 205 and then turns downwardly to form a leg 217 before turning upwardly again to form inclined member 218. The free end of inclined member 218 is turned over to form a knot 219 that acts as a locating means and holds the parallel parts of hook portion 211 in alignment one with another and provides a deflection limit bar which rests in lobes 209, 215. The configuration of the hook portion 211, which has been double wound, is created by combination radii which provides increased strength and elasticity.

The free end of second transverse member 206 is bent upwardly as indicated at 220 to form one arm of a retainer portion for the tip 212 of hook portion 211. It is bent to form crossbar 221 and an arm 222 which is parallel to arm 220, arms 220 and 222 forming together with the crossbar 221 a loop for receipt of the tip 212 of portion 211. The portion of the wire beyond the end of arm 222 is bent around to form a further transverse member 223, is formed with a hairpin bend at 224, and terminates in a further transverse portion 225. These last mentioned parts form a webbing or rope keeper.

FIGS. 17 to 20 illustrate the operation of the fastener of FIGS. 13 to 16. A strap 226 is passed through the eye of flat spiral spring 204, over transverse members 206 and 205 and then over member 216 and transverse member 223, and is then brought back through the eye of flat spiral spring 204.

To engage the fastener 201 with an anchorage, the legs 202 and 203 are squeezed together manually, as illustrated in FIG. 20, thereby releasing tip 212 from retainer portion 220. In the course of this movement transverse member 205 and member 216 move between and are guided by arms 220 and 222 of retainer portion. Hook portion 211 can then be engaged with an anchorage; upon releasing the manual pressure, the legs 202 and 203 take up again the configuration of FIG. 17 thus repositioning tip 212 in retainer 220. Upon loading strap 226 bend 207 deforms elastically, then bend 208 and, after that, hook portion 211, resulting in disappearance of clearance 227 (which is visible in FIG. 18) and in locking of the tip 212 in the retainer 220. The load on the strap 226 also causes inward pressure on transverse members 206, 205, 223, and 216 (i.e. lateral inward pressure as indicated by arrows A in FIG. 18) which increases the locking action and increases the security of the fastener.

As the load on the strap 226 is further increased the transverse member 206 is drawn downwards (as illustrated in FIG. 17) by reason of its connection to the retainer portion 220, thereby bringing the deflection limit bar 219 into contact with the lobes 209, 215 and limiting further deflection. At this position, . under strain, increased loads are contained elastically until plastic deformation occurs in the hook portion 211 at or adjacent the abutment between the tip 212 and crossbar 221.

A further function of deflection limit bar 219 is to constrain opening of the fastener 201 when legs 202 and 203 are squeezed together manually thus preventing overstressing of the torsion coils of intermediate portion 204.

Upon releasing the load on strap 226 the fastener 201 recovers original shape elastically and the members 206, 205, 223, and 216 spring apart again (in a direction opposite to the arrows A of FIG. 18) to allow opening of the fastener.

Again, it will be noted that the same simple action, i.e. a simple squeezing action, is required both to secure the fastener of FIGS. 13 to 20 to an anchorage and to release it therefrom.

FIGS. 21 to 24 illustrate a further form of fastener 301 constructed according to the invention. This is generally similar to fastener 201 of FIGS. 13 to 20 and accordingly like parts have been assigned like reference numerals. In fastener 301 the end of leg 217 is bent round leg 202 to form a knot 228 and, in place of knot 219, which forms a deflection limit bar in fastener 201 of FIGS. 13 to 20, a separate deflection limit link 229 is bent around lobes 209 and 215.

As shown in FIG. 24, the fastener 301 can be further strengthened by use of a helper 230 cast from an epoxy resin-glass fibre composite or made from stainless steel leaf which is suitably keyed or fastened between the curved parts 211 and 213. Such a helper 230 is particularly useful for large size embodiments for use with girders and scaffolding.

The link 229 can be made from wire of larger diameter than that used for the main body of fastener 301. In this way the load holding characteristics of the fastener 301 can be improved, particularly if a helper 230 is used which also increases the load bearing value of the fastener 301.

The materials of construction of the illustrated form of fastener and the diameter of the wire used should be selected in dependence upon the intended load bearing capacity and upon the intended environment of use. Preferably, the wire is made from stainless steel, such as Type 302S26 (see British Standard 2056 revised in 1983) formerly called EN58A, or from a plated high tensile alloy spring steel wire, for example galvanised spring steel wire. It is also feasible to use a strand of hexagonal, square or other rectangular section in place of wire. As the stiffness of the wire or strand will increase with increasing thickness, it may be necessary to increase the diameter of the coils of the flat spiral spring into which the intermediate portion, such as intermediate portion 4 of the fastener of FIG. 1, is wound and/or to increase the number of turns in the spring from 1½ turns to, for example, 2½ turns in order to retain sufficient ease of torsion for manual operation of the fastener.

The illustrated forms of fastener exhibit excellent strength to weight ratios. It is found that the strength to weight ratio is highest for fasteners of small dimensions and decreases as the size of the fastener is increased for greater design breaking loads; a similar decrease in strength to weight ratio is also to be observed with the best available conventional designs of manually operable fastener. For example, a fastener of the type illustrated in FIGS. 13 to 16 made from a single length of 4.5 mm diameter Type 302S26 stainless steel wire was tested to destruction. Failure occurred adjacent the retroussé tip 11 at a load corresponding to a strength to weight ratio in excess of 20000:1. This compares with a calculated strength to weight ratio of about 7200:1 for the best available state of the art carabiners which are designed for a similar breaking load and are made from the same material from 5 parts with 3 junctions.

A further fastener of a similar type to that illustrated in FIGS. 13 to 16 was made of 8 mm diameter Type 302S26 stainless steel rod. This has a hook portion with a shank and bend portion and also a retainer portion which are of relatively much larger dimensions, compared to the dimensions of its first and second legs and of its transverse members, than the corresponding dimensions of the fastener of, for example, FIGS. 1 to 4. This enables the fastener to be opened sufficiently to pass its hook portion around anchorages having a dimension of up to 15 cm. Fasteners of this type are useful for safety harnesses which are for use in the building industry when it is desired to use a scaffolding pole, a girder or an I-section beams as an anchorage. A careful mathematical analysis of the characteristics of such a fastener indicates that it will not fail in a destruction test until subjected to a load of at least 6.875 tonnes, corresponding to a strength to weight ratio approximately 4300:1. This analysis further predicts that failure will eventually occur by reason of fracture of the hook portion in the bend portion adjacent the retroussé tip.

What is claimed is:

1. A manually operable fastener for securing a rope or strap to an anchorage, to safely support a human being or a load of comparable weight, said fastener comprising a length of wire or strand bent into a substantially flat shape and including a first leg; a second leg; an intermediate portion between the first and second legs formed into a flat spiral spring which forms an eye, which is maintained under torsion in a normally closed condition of the fastener, and which is connected at one end to a proximal end of the first leg and at its other end to a proximal end of the second leg, the first and second legs subtending an acute angle therebetween; a first transverse member connected at one of its ends to a distal end of the first leg; a second transverse member connected at one of its ends to a distal end of the second leg, the first and second transverse members extending towards one another and including overlapping parts which lie in juxtaposed relationship one with another and are substantially parallel to one another in the normally closed condition of the fastener; a hook portion at the other end of the first transvere member, the hook portion including a shank extending away from the intermediate portion, a bend portion that has its concave side facing towards the intermediate portion, and a smooth retroussé tip formed by looping the wire or strand back on itself; a retainer portion at the other end of the second transverse member, the retainer portion including a loop portion to receive the hook portion in the normally closed condition of the fastener; and a third transverse member having a part which lies in a plane which is substantially parallel to that of the second transverse member, which overlaps the first transverse member, and which has a connection to the retainer portion, and which is disposed on the other side of the first transverse member from the second transverse member; the retainer portion forming together with the hook portion and the overlapping parts of the first, second and third transverse members an essentially closed loop in the normally closed condition of the fastener; said fastener being arranged to receive a portion of a rope or strap which passes through the eye of the flat spiral spring, through the essentially closed loop and back through the eye of the flat spiral spring and being openable in an unloaded condition of the fastener by manually squeezing the first and second legs towards one another against the torison of the flat spiral spring thereby to disengage the hook portion from the loop portion of the retainer portion and said fastener further being arranged so that upon application of a load to said rope or strap so as to place the fastener in a loaded condition, said rope or strap squeezes the overlapping parts of said second and third transverse members one towards another so as to tend to exert a gripping action on the corresponding overlapping part of said first transverse member which lies therebetween and to hold the overlapping parts of said first and second transverse members substantially parallel one to another said fastener further including an automatically self closing spring clip lock to prevent inadvertent opening of the fastener in its unloaded condition, which clip lock comprises a second length of wire or strand of smaller section than that of the first mentioned wire or strand bent to form a hook one end of which is secured to the retainer portion and the other hooked end of which is engageable with the hook portion, wherein the second length of wire is bent in half at a hairpin bend in a first plane before being bent into a double hook shape in a second plane substantially at right angles to said first plane.

2. A fastener according to claim 1, in which the first and second legs define together with the transverse members a substantially triangular outline with the flat spiral spring lying within said triangular outline.

3. A fastener according to claim 1, in which there is, in the unloaded condition of the fastener, a clearance between the smooth retroussé tip and the closed end of the loop portion of the retainer portion permitting opening of the fastener and in which the fastener undergoes elastic deformation during loading thereof thereby to cause locking of the smooth retroussé tip in the loop of the retainer portion.

4. A fastener according to claim 1, in which the smooth retroussé tip of the hook portion is formed by a curled over end of the first mentioned wire or strand.

5. A fastener according to claim 1, in which said fastener further includes a separate locating means arranged to engage with the overlapping parts of the first and second transverse members and to maintain the overlapping parts of the first and second transverse members in juxtaposed relationship.

6. A fastener according to claim 1, which further includes a locating means formed by an end of the length of the wire or strand on a first one of the first and second legs, which end is bent around the transverse member of the other one of the first and second legs.

7. A fastener according to claim 1, in which said wire or strand forming said retainer portion further includes a portion which forms a keeper for a rope or strap.

8. A manually operable fastener for securing a rope or strap to an anchorage, to safely support a human being or a load of comparable weight, said fastener comprising a length of wire or strand bent into a substantially flat shape and including a first leg; a second leg; an intermediate portion between the first and second legs formed into a flat spiral spring which forms an eye, which is maintained under torsion in a normally closed condition of the fastener, and which is connected at one end to a proximal end of the first leg and at its other end to a proximal end of the second leg, the first and second legs subtending an acute angle therebetween; a first transverse member connected at one of its ends to a distal end of the first leg; a second transverse member connected at one of its ends to a distal end of the second leg, the first and second transverse members extending towards one another and including overlapping parts which lie in juxtaposed relationship one with another and are substantially parallel to one another in the normally closed condition of the fastener; a hook portion at the other end of the first transverse member, the hook portion including a shank extending away from the intermediate portion, a bend portion that has its concave side facing towards the intermediate portion, and a smooth retroussé tip formed by looping the wire or strand back on itself; the hook portion being formed by bending the length of wire or strand back on itself at the smooth retroussé tip of the hook portion so that the bend portion is formed by a pair of side-by-side portions of said wire or strand; a retainer portion at the other end of the second transverse member, the retainer portion including a loop portion to receive the hook portion in the normally closed condition of the fastener; and a third transverse member having a part which lies in a plane which is substantially parallel to that of the second transverse member, which overlaps the first transverse member, and which has a connection to the retainer portion, and which is disposed on the other side of the first transverse member from the second transverse member; the retainer portion forming together with the hook portion and the overlapping parts of the first, second and third transverse members an essentially closed loop in the normally closed condition of the fastener; said fastener being arranged to receive a portion of a rope or strap which passes through the eye of the flat spiral spring, through the essentially closed loop and back through the eye of the flat spiral spring and being openable in an unloaded condition of the fastener by manually squeezing the first and second legs towards one another against the torsion of the flat spiral spring thereby to disengage the hook portion from the loop portion of the retainer portion, and said fastener further being arranged so that upon application of a load to said rope or strap so as to place the fastener in a loaded condition, said rope or strap squeezes the overlapping parts of said second and third transverse members one towards another so as to tend to exert a gripping action on the corresponding overlapping part of said first transverse member which lies therebetween and to hold the overlapping parts of said first and second transverse members substantially parallel one to another; wherein said wire or strand is bent towards the intermediate portion at said other end of the first transverse member so as to form a first lobe at the base of the shank of the hook portion, in which the portion of said wire or strand forming the hook portion includes a second lobe and a further fourth transverse member substantially parallel to and aligned with the first lobe and with the first transverse member respectively, and in which deflection limiting means are provided for engagement with said first and second lobes.

9. A fastener according to claim 8, in which the hook portion is provided with a sheathing reinforcement made from a material selected from polymer resins, reinforced polymer resins and leaf metal.

10. A fastener according to claim 8, in which said deflection limiting means is integrally formed in said length of wire or strand by the free end of a continuation of said fourth transverse member.

11. A fastener according to claim 8, in which said deflection limiting means comprises a second length of wire or strand which is bent around said first and second lobes.

12. A safety harness comprising a rope or strap engaged with a manually operable fastener, said fastener comprising a length of wire or strand bent into a substantially flat shape and including a first leg; a second leg; an intermediate portion between the first and second legs formed into a flat spiral spring which forms an eye, which is maintained under torsion in a normally closed condition of the fastener, and which is connected at one end to a proximal end of the first leg and at its other end to a proximal end of the second leg, the first and second legs subtending an acute angle therebetween; a first transverse member connected at one of its ends to a distal end of the first leg; a second transverse member connected at one of its ends to a distal end of the second leg, the first and second transverse members extending towards one another and including overlapping parts which lie in juxtaposed relationship one with another and are substantially parallel to one another in the normally closed condition of the fastener; a hook portion at the other end of the first transverse member, the hook portion including a shank extending away from the intermediate portion, a bent portion that has its concave side facing towards the intermediate portion, and a smooth retroussé tip formed by looping the wire or strand back on itself; a retainer portion at the other end of the second transverse member, the retainer portion including a loop portion to receive the hook portion in the normally closed condition of the fastener; a third transverse member having a part which lies in a plane which is substantially parallel to that of the second transverse member, which overlaps the first transverse member, and which has a connection to the retainer portion, and which is disposed on the other side of the first transverse member from the second transverse member; the retainer portion forming together with the hook portion and the overlapping parts of the first, second and third transverse members an essentially closed loop in the normally closed condition of the fastener; said rope or strap being engaged with said fastener so as to pass through the eye of the flat spiral spring, through the essentially closed loop and back through the eye of the flat spiral spring and being arranged so that upon application of a load to said rope or strap so as to place the fastener in a loaded condition, said rope or strap squeezes the overlapping parts of said second and second transverse members one towards another so as to tend to exert a gripping action on the corresponding overlapping part of said first transverse member which lies therebetween and to hold the overlapping parts of said first and second transverse members substantially parallel one to another; and said fastener being openable by manually squeezing the first and second arms towards one another against the torsion of the flat spiral spring in an unloaded condition of the safety harness thereby to disengage the hook portion from the loop portion of the retainer portion.

13. A safety harness according to claim 12, passes through said eye, around the overlapping parts of said first, second and third members in at least one complete turn, and back through the eye.

14. A safety harness according to claim 12, further including a locking member for the fastener having a channel therethrough through which the rope or strap passes, which locking member is arranged to lie in the loaded condition of the fastener in the space between the first and second legs and between the transverse members and the intermediate portion and prevent movement of the first and second legs one towards another and consequential inadvertent opening of the fastener, and which locking member is arranged to be displaceable out of the said space in the unloaded condition of the fastener to permit the first and second legs to be squeezed manually one towards another to open the fastener.

15. A safety harness according to claim 14, in which the locking member is constructed so as to float in water and is substantially in the shape of a truncated cone.

16. A safety harness according to claim 14, in which the locking member is constructed so as to float in water and is substantially in the shape of a flat axial section of a truncated cone.

* * * * *

UNITED STATES PATENT AND TRADEMARK OFFICE
CERTIFICATE OF CORRECTION

PATENT NO. : 4,759,103

DATED : July 26, 1988

INVENTOR(S) : Roy Wallace Henderson

It is certified that error appears in the above-identified patent and that said Letters Patent is hereby corrected as shown below:

Column 12, line 52, Claim 8: "a further fourth" should read as --a fourth--

Signed and Sealed this

Tenth Day of October, 1989

Attest:

DONALD J. QUIGG

Attesting Officer      Commissioner of Patents and Trademarks